(12) United States Patent
Saecker et al.

(10) Patent No.: US 11,435,236 B2
(45) Date of Patent: Sep. 6, 2022

(54) TEMPERATURE SENSOR

(71) Applicant: Endress+Hauser Wetzer GmbH+Co. KG, Nesselwang (DE)

(72) Inventors: Dietmar Saecker, Füssen (DE); Alfred Umkehrer, Hopferau (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 302 days.

(21) Appl. No.: 16/472,384

(22) PCT Filed: Dec. 6, 2017

(86) PCT No.: PCT/EP2017/081684
§ 371 (c)(1),
(2) Date: Jun. 21, 2019

(87) PCT Pub. No.: WO2018/114336
PCT Pub. Date: Jun. 28, 2018

(65) Prior Publication Data
US 2019/0360871 A1    Nov. 28, 2019

(30) Foreign Application Priority Data
Dec. 22, 2016    (DE) .................. 10 2016 125 403.7

(51) Int. Cl.
*G01K 5/02*    (2006.01)
*G01K 7/22*    (2006.01)
(Continued)

(52) U.S. Cl.
CPC ............... *G01K 5/025* (2013.01); *G01K 7/22* (2013.01); *G01K 1/08* (2013.01); *G01K 1/16* (2013.01); *G01K 7/02* (2013.01); *G01K 7/16* (2013.01)

(58) Field of Classification Search
CPC .................................. G01K 5/025; G01K 7/22
See application file for complete search history.

(56) References Cited

U.S. PATENT DOCUMENTS 4,655,609 A * 4/1987 Alber ..................... G01K 5/025
                                                            206/306
6,102,565 A * 8/2000 Kita ........................ G01K 1/125
                                                            374/E1.017
(Continued)

FOREIGN PATENT DOCUMENTS

CN    201672984 U    12/2010
CN    103187131 A    7/2013
(Continued)

*Primary Examiner* — Nathaniel T Woodward
*Assistant Examiner* — Philip L Cotey
(74) *Attorney, Agent, or Firm* — Mark A. Logan; Endress+Hauser (USA) Holding Inc.

(57) ABSTRACT

The present disclosure relates to an apparatus for determining and/or monitoring temperature of a liquid. The apparatus includes at least one temperature sensor arranged in a sensor head. Furthermore, the present disclosure relates to a method for manufacturing the apparatus. At least one internal volume of the sensor head is at least partially filled with at least one first material and at least one second material. The first material serves for affixing at least one component of the temperature sensor within the sensor head, and the second material serves for heat conduction within the sensor head.

13 Claims, 2 Drawing Sheets

(51) Int. Cl.
*G01K 1/16* (2006.01)
*G01K 7/02* (2021.01)
*G01K 7/16* (2006.01)
*G01K 1/08* (2021.01)

(56) References Cited

U.S. PATENT DOCUMENTS

| | | | | |
|---|---|---|---|---|
| 8,198,976 | B2* | 6/2012 | Thomsen | G01K 7/183 |
| | | | | 428/670 |
| 8,491,184 | B2* | 7/2013 | Kamen | G01N 25/18 |
| | | | | 73/863.61 |
| 2004/0076215 | A1* | 4/2004 | Baumbach | G01K 1/16 |
| | | | | 374/E7.042 |
| 2005/0129089 | A1* | 6/2005 | Glozman | G01K 1/12 |
| | | | | 374/E1.016 |
| 2007/0253463 | A1* | 11/2007 | Perry | F04B 39/123 |
| | | | | 374/208 |
| 2008/0184790 | A1* | 8/2008 | Ding | G01F 1/684 |
| | | | | 73/204.25 |
| 2008/0205484 | A1* | 8/2008 | Toudou | G01K 1/08 |
| | | | | 374/E1.016 |
| 2009/0296781 | A1* | 12/2009 | Weber | G01K 7/16 |
| | | | | 374/185 |
| 2010/0118916 | A1* | 5/2010 | Thomsen, III | G01K 7/028 |
| | | | | 977/734 |
| 2012/0082181 | A1* | 4/2012 | Alnaqash | G01K 13/02 |
| | | | | 374/208 |
| 2015/0204807 | A1* | 7/2015 | Kamen | G01N 25/18 |
| | | | | 374/44 |
| 2016/0334814 | A1* | 11/2016 | Dinkel | G01K 7/34 |

FOREIGN PATENT DOCUMENTS

| | | |
|---|---|---|
| CN | 104769402 A | 7/2015 |
| DE | 102011083437 A1 | 7/2012 |
| DE | 112011102974 T5 | 7/2013 |
| DE | 102014107645 A1 | 12/2015 |
| DE | 112015001343 T5 | 12/2016 |
| JP | 2016029359 A | 3/2016 |
| WO | 2014012818 A2 | 1/2014 |

* cited by examiner

TEMPERATURE SENSOR

CROSS-REFERENCE TO RELATED APPLICATIONS

The present application is related to and claims the priority benefit of German Patent Application No. 10 2016 125 403.7, filed on Dec. 22, 2016 and International Patent Application No. PCT/EP2017/081684 filed on Dec. 6, 2017, the entire contents of which are incorporated herein by reference.

TECHNICAL FIELD

The present invention relates to an apparatus for determining and/or monitoring temperature and having at least one temperature sensor and to a method for manufacturing an apparatus of the invention.

BACKGROUND

Thermometers are known from the state of the art in the most varied of embodiments. Thus, there are thermometers, which, for measuring temperature, reference the expansion of a liquid, a gas or a solid body of known coefficient of expansion, or also such, which relate the electrical conductivity of a material to the temperature, such as, for example, in the case of applying resistance elements or thermocouples. In contrast, in the case of radiation thermometers, especially pyrometers, the determining of the temperature of a substance utilizes its thermal radiation. The underpinning measuring principles for these varied thermometers are described in a large number of publications.

In the case of a temperature sensor in the form of a so-called thin film sensor, especially a Resistance Temperature Detector (RTD), for example, a sensor element is used, which is equipped with connection wires and applied on a substrate, wherein the rear side of the substrate is, as a rule, coated with metal. Used as the sensor elements are so-called resistance elements, for example, in the form of platinum elements, which are also commercially obtainable under the designations, PT10, PT100, and PT1000.

The resistance elements are frequently mounted by means of a soldering process within a sensor head, for example, a sensor tip, and especially on the inner floor of a sleeve e.g. of stainless steel. As soldering method, in many cases, a so-called SMD soldering is performed, wherein, firstly, a solder is applied on a first component and then a second component is placed on the solder and soldered to the first component by heating. For example, a sensor head of a resistance thermometer is usually, firstly, provided with a defined amount of solder in a solid state ("solder platelet") and by subsequent heating melted on the inner floor of the sensor head. The sensor element is then immersed with its metallized face in the solder and, in this way, soldered within the sensor head. Methods for the manufacture of such a solder connection for a thermometer are known, for example, from Offenlegungsschrift DE102006048448A1, as well as from the German patent application with the Application No. 102015112199.9 unpublished at the date of the first filing of this application. Fundamentally in the case of a corresponding resistance thermometers, the solder connection has a large influence on the thermal properties of the thermometer, especially on the thermal coupling between resistance element and sensor head. Corresponding thermometers are produced and sold by the applicant, for example, under the mark, Quicksens.

Alternatively to such thermometers, in the case of which the resistance element is soldered to the sensor head, numerous thermometers are known, in the case of which the temperature sensors are enclosed and/or encapsulated, especially in ceramic powders, such as, for example, magnesium oxide (MgO) or aluminum oxide ($Al_2O_3$), or in a ceramic potting compound, especially a hardenable ceramic potting compound. This procedure serves, on the one hand, for affixing the temperature sensors. Moreover, the encapsulation, for example, in a ceramic powder provides that the connection lines of the temperature sensor, even at high temperatures, especially at temperatures, for instance, up to 600° C., are mutually insulated and insulated from the housing of the sensor head, especially from a sensor tip, which frequently is manufactured of a metal or a metal alloy. A method for manufacturing a thermometer embodied in such a manner is known, for example, from Offenlegungsschrift DE02329239A1. In order to pot a temperature sensor, at least predeterminable amounts of first and second components of a potting compound are introduced into a mold, especially a sensor tip. Then, the sensor tip is shaken and/or caused to oscillate with a predeterminable frequency. Such thermometers are produced and sold by the applicant, for example, under the mark, Strongsens.

Advantageously, resistance thermometers, in the case of which the temperature sensor is soldered to the sensor head, have especially good response times for reacting to a change of the temperature of a liquid. Disadvantageously, however, such thermometers are not suitable for use at high temperatures, especially temperatures T>200° C. Also, these thermometers have, compared with thermometers, in the case of which the temperature sensor is enclosed and/or encapsulated, a lesser mechanical stability. Thermometers with enclosed and/or encapsulated temperature sensors have, in turn, poorer response times compared with thermometers having soldered temperature sensors.

SUMMARY

Starting from the above described state-of-the-art, an object of the present invention is to improve the response times of thermometers with enclosed and/or encapsulated temperature sensors.

The object is achieved by the apparatus as defined in claim 1 as well as by the method for manufacturing an apparatus of the invention, as such method is defined in claim 12. Advantageous embodiments of the apparatus and the method appear in the dependent claims.

Regarding the apparatus, the object of the invention is achieved by an apparatus for determining and/or monitoring temperature of a liquid, comprising at least one temperature sensor arranged in a sensor head, wherein at least one internal volume of the sensor head is at least partially filled with at least one, first material and at least partially with at least one, second material. In such case, the first material serves for affixing at least one component of the temperature sensor within the sensor head and the second material for heat conduction within the sensor head. At least one component of the temperature sensor, preferably the entire sensor element, for example, a resistance element, and/or at least one subregion of at least one connection wire for the temperature sensor, are, thus, according to the invention, enclosed and/or encapsulated. In contrast to conventional thermometers with enclosed and/or encapsulated temperature sensors, the applied fill material of the invention includes at least one, first material, which serves for heat conduction within the sensor head. This leads to a significantly improved response time of the temperature sensor. In contrast to thermometers, in the case of which the sensor element is connected directly with the sensor head via soldering, the temperature sensor is, moreover, affixed within the sensor head because of the second material used for the fill material.

For determining and/or monitoring temperature of a liquid, the sensor head is brought into contact, especially thermal contact, with the liquid. Heat exchange occurs between the apparatus and the liquid, until a thermal equilibrium is established. Then, the sensor head with the temperature sensor and the liquid have essentially the same temperature, in the following referred to as the equilibrium temperature. Until this equilibrium is achieved, heat moves from the surface of the sensor head facing the liquid, into the interior of the sensor head, and then to the temperature sensor. The heat movement in this connection can also include both a heat flux from the liquid to the temperature sensor, corresponding to the case, in which the liquid has a higher temperature than the thermometer, as well as also in the reverse direction, in which case, the thermometer has a higher temperature. The time, which passes, until, after a temperature change $\Delta T$ of the liquid, thermal equilibrium is reestablished, correlates, in such case, with the response time of the thermometer. The response time of a thermometer depends, in such case, basically on the thermal conductivities of the utilized materials as well as on the geometric embodiment and on the quality of contacts produced between different materials.

In an embodiment, the temperature sensor includes at least one temperature sensitive sensor element and at least one connection wire for, especially electrical, contacting of the sensor element.

The first material is preferably embodied to stabilize, especially mechanically, at least one component of the temperature sensor within the sensor head, and/or to protect such against vibrations, and/or to provide electrical insulation of the at least one component of the temperature sensor, especially the at least one connection wire of the temperature sensor. An electrical insulation of at least one connection wire of the temperature sensor can alternatively also be provided by a sleeve of an electrically insulating material or a corresponding molded body.

Especially preferably, the first material is a ceramic, especially magnesium oxide or aluminum oxide, or an, especially curable, ceramic potting compound. The second material can thus especially also be a multi-component material with at least a first and at least a second component.

In a preferred embodiment, the second material has a high thermal conductivity $\lambda$, especially a thermal conductivity $\lambda$ of $\lambda > 100$ W/(mK) at 0° C. The second material is thus preferably embodied to assure a best possible heat transfer per unit time within at least a subregion of the sensor head.

In an additional, preferred embodiment, the second material is selected in such a manner that a thermal time constant for a cube shaped body of the second material with a volume of 1 mm$^3$ is less than 0.1 s. The thermal time constant can be calculated from a product of a thermal resistance and a heat capacity of the second material.

The heat capacity C of a body, especially a homogeneous body, is defined as C=cm, wherein c is the specific heat capacity and m the mass of the body. The thermal resistance $R_{th}$, also referred to as heat conduction resistance, in turn, is calculated as $R_{th}=l/(\lambda A)$, wherein l is the length of the body, A its cross sectional area, constant over length and $\lambda$ the thermal conductivity. The product of the heat capacity C and the thermal resistance $R_{th}$ is the thermal time constant $\tau$, which according to the invention should be as small as possible. Especially, the time constant should be less than 0.1 s normalized to a body with a volume of 1 mm$^3$.

Preferably, the second material, present, for example, in the form of a powder, is carbon nanotubes, boron nitride, aluminum nitride, silicon carbide, or metal, especially aluminum, copper or silver.

Carbon nanotubes have at room temperature a thermal conductivity $\lambda$ of $\lambda > 3000$ W/(mK), while the thermal conductivity $\lambda$ of boron nitride, especially hexagonal boron nitride, lies at $\lambda \approx 600$ W/(mK) in a direction along a base plane. At a temperature of 0° C., the thermal conductivity $\lambda$ of aluminum nitride lies, in contrast, at $\lambda \approx 180$-220 W/(mK) and that of silicon carbide at $\lambda \approx 350$ W/(mK). For aluminum, the thermal conductivity $\lambda$ is $\lambda \approx 236$ W/(mK) at a purity >99.5%, for silver $\lambda \approx 429$ W/(mK) at 0° C., and for copper $\lambda \approx 200$-400 W/(mK), depending on degree of purity.

In an embodiment of the apparatus of the invention, at least one internal volume of the sensor head is filled with a mixture comprising at least the first and second materials. In the case of this embodiment, the at least one preferably each, externally electrically conductive component of the temperature sensor is advantageously electrically insulated. Thus, preferably, the first and/or second materials are electrically insulating materials, or the at least one component of the temperature sensor is electrically insulated in some other manner. Available to those skilled in the art for this are all established options for electrical insulation of individual components.

In an alternative, especially preferred, embodiment, at least one internal volume of the sensor head has at least two subregions, wherein a first subregion of the internal volume is filled with the first material and wherein a second subregion of the internal volume is filled with the second material.

In such case, it is advantageous that the first subregion is arranged at least partially in the region of the at least one connection wire, and when the second subregion is arranged at least partially in the region of the sensor element. Preferably in this case, at least the first component is an electrically insulating material. A low thermal conductivity of the first material is advantageous in the case of such an arrangement, because, in this way, heat conduction between the thermometer, and the process and the environment, respectively, is lessened.

In an advantageous embodiment, the sensor head includes an, especially cylindrical, lateral surface, and an, especially circular, floor. The sensor head is preferably a sensor tip, especially a sleeve shaped sensor tip, of a thermometer.

In an additional, preferred embodiment, the temperature sensor comprises a resistance element, especially a platinum element, or a thermocouple.

The object of the invention is achieved further by a method for manufacturing an apparatus of the invention for determining and/or monitoring temperature of a liquid, comprising method steps as follows:
  introducing at least one component of a temperature sensor into a sensor head; and
  filling an internal volume of the sensor head at least partially with at least one, first material and at least partially with at least one, second material.

For introducing the first material and second materials, for example, the method described in Offenlegungsschrift DE02329239A1 can be applied.

An embodiment of the method includes that at least one internal volume of the sensor head is filled with a mixture comprising at least the first material and the second material. The first and second materials can, on the one hand, first be mixed together and then filled into the internal volume. On the other hand, it is likewise possible to fill the first and second materials sequentially into the sensor head and to mix them together within the sensor head.

In an alternative embodiment of the method of the invention, the first material is filled into a first subregion, and the second material into a second subregion.

The embodiments described in connection with the apparatus of the invention are applicable mutatis mutandis also for the method of the invention and vice versa.

BRIEF DESCRIPTION OF THE DRAWINGS

The invention will now be explained in further detail based on the appended drawing, the figures of which show as follows.

Figure 1:
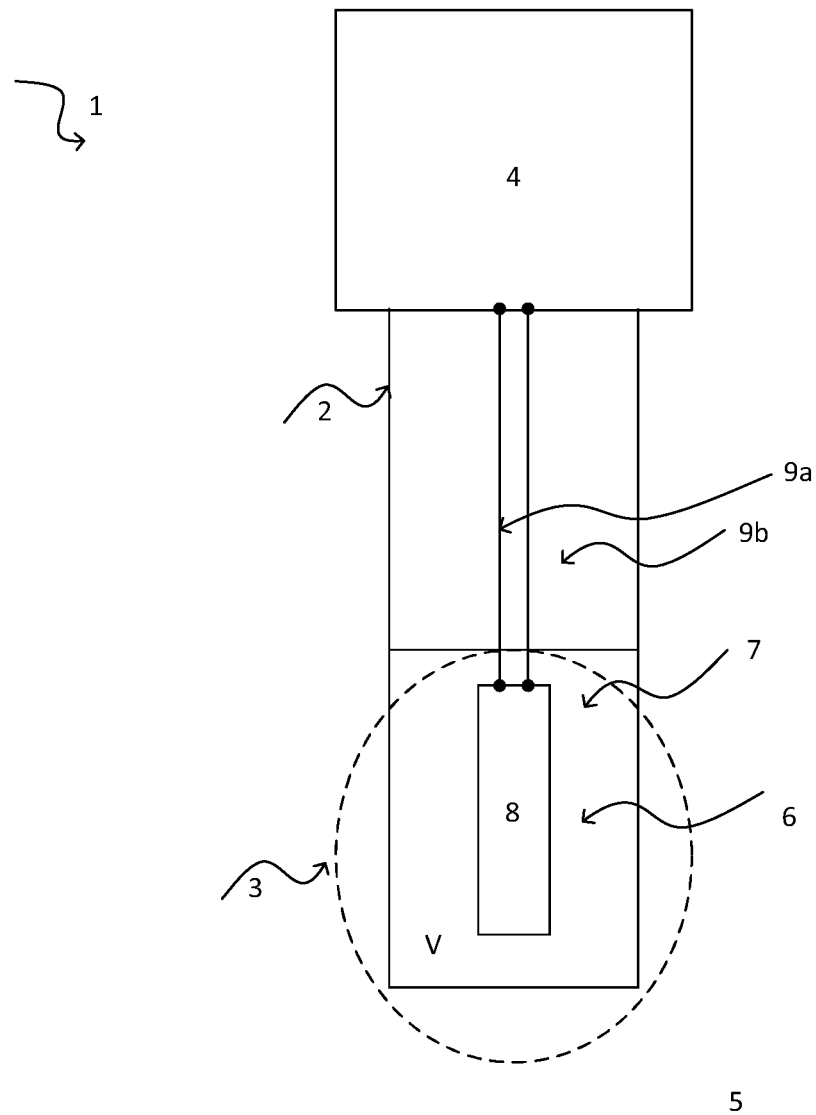
FIG. 1 shows a schematic view of a thermometer of the prior art.

In the following, equal elements are provided with equal reference characters.

DETAILED DESCRIPTION

FIG. 1 is a schematic view of a thermometer 1 having a protective tube 2 and an electronics unit 4 according to the state of the art. The subregion of the protective tube 2 toward the liquid 5 is also referred to as the sensor head 3. An internal volume V of the sensor head 3 is filled with a filler 6, for example, a ceramic potting compound. Further arranged in the internal volume V of the sensor head 3 is a temperature sensor 7, which in the shown embodiment comprises a sensor element 8, here in the form of a resistance element, and two connection wires 9a, 9b for electrically contacting the electronics unit 4. The sensor element 8 as well as a subsection of the connection wires 9a, 9b of the temperature sensor 7 are enclosed and/or encapsulated by the filler 6 within the internal volume V of the sensor head 3. This leads to an especially high mechanical stability and vibration resistance of the thermometer 1. However, the generally known materials suitable for assuring a high mechanical stability and vibration resistance are marked disadvantageously by comparatively low thermal conductivities $\lambda$. Thus, thermometers 1, in the case of which at least one component of the temperature sensor 7, in this case, the sensor element 7 and a subsection of the connection wires 9a, 9b are enclosed or encapsulated in a filler 6, have comparatively low response times. This problem is met by the present invention in that an internal volume V of the sensor head 3 is filled at least partially with at least one, first material 10 and at least partially with at least one, second material 11, wherein the first material 10 serves for affixing at least one component of the temperature sensor 7, e.g. the sensor element 8 or the connection wires 9a, 9b, within the sensor head 3, and wherein the second material 11 serves for heat conduction within the sensor head 3.

Figure 2:
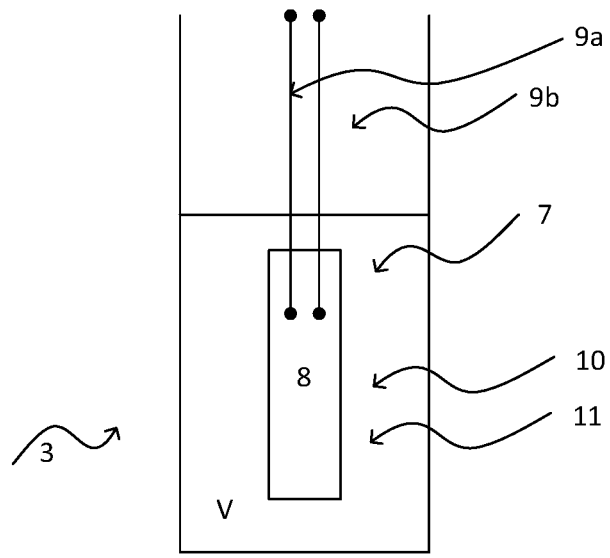
FIG. 2 shows a sensor head of a thermometer in a first embodiment of the present disclosure.

A first embodiment of the present invention is shown in FIG. 2, which is a schematic view of a sensor head 3 with an internal volume V, which is filled with a mixture of the first material 10 and the second material 11. The first material is, for example, a ceramic or an, especially curable, ceramic potting compound, thus a filler of the state of the art. The second material, in contrast, is a material with a high thermal conductivity $\lambda$, for example, carbon nanotubes. The thermal conductivity of carbon nanotubes, and, for example, also of hexagonal boron nitride, is spatially anisotropic. Correspondingly, it is advantageous that the second material 11 in the case of an anisotropic thermal conductivity $\lambda$ is oriented in such a manner within the sensor head 3 that especially along a connection path between the outer walls of the sensor head 3 and the sensor element 8 of the temperature sensor 7 an especially high value is present for the thermal conductivity. This can be achieved in the case of carbon nanotubes, for example, by applying a suitable electrical field, which passes through the internal volume V of the sensor head 3, during filling of the sensor head 3 with the carbon nanotubes.

Different measures are available for preventing an electrical short circuit between at least one component 8,9 of the temperature sensor 7 and the sensor head 3, which is usually manufactured of metal. The connection wires 8,9 can be surrounded throughout a large portion of their length by an electrical insulation (not shown). In the region of contacting the connection wires 9a,9b, an electrically insulating, molded part (likewise not shown) can be used. Alternatively, it can also be provided, for example, that the first 10 and second 11 materials are not electrically conductive in this region. Regarding this subject matter, many other options are known to those skilled in the art, and these all fall within the scope of the present invention.

Figure 3:
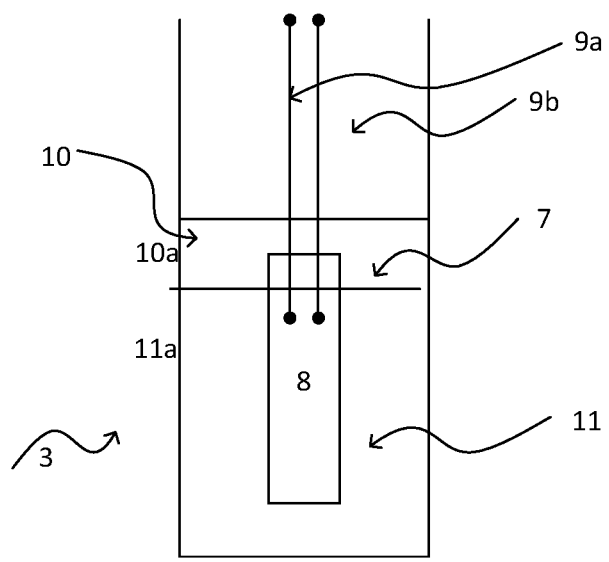
FIG. 3 shows a sensor head of a thermometer in a second embodiment of the present disclosure.

A second embodiment of the present invention is subject matter of FIG. 3. In contrast to FIG. 2, in this second embodiment, the internal volume V of the sensor head 3 is divided into two subregions 10a and 11a. The first subregion 10a is filled with the first material 10, especially a ceramic or a ceramic potting compound. The second subregion 11a, in turn, is filled with the second material 11, for example, a powder of carbon nanotubes. Preferably, the first subregion 10a is arranged in such a manner within the sensor head 3 that it surrounds at least a subsection of the connection wires 9a, 9b, especially a subsection of the connection wires 9a, 9b, in which the electrical contacting with the sensor element 8 occurs.

Preferably, the first material 10 is an electrically insulating material in this embodiment. The first material 10 in the embodiment of FIG. 3 surrounds besides a subsection of the connection wires 9a,9b, moreover, a subsection of the sensor element 8. In this way, the temperature sensor 7 is best affixed within the sensor head 3 and the thermometer 1 has, correspondingly, a high mechanical stability and vibration resistance.

The second subregion 11a is, in turn, preferably arranged in such a manner that it surrounds at least a subsection of the sensor element 8. In the case of a conventional sensor element 8 embodied as a platinum resistance element, the sensor element 8 is usually electrically insulated outside of the region, in which the electrical contacting by means of the connection wires 9a,9b is performed. The second material has, advantageously, a high thermal conductivity $\lambda$ and the thermometer 1 has, correspondingly, an especially good response time to a temperature change $\Delta T$ of a liquid 5. Also for the embodiment of FIG. 3, in the case of a second material 11 with an anisotropic thermal conductivity $\lambda$, a beneficial orientation within the sensor head 3 is desirable.

A special advantage, which results from an arrangement of FIG. 3, in the case of which the first material 10 arranged within the first subregion 10a has a low thermal conductivity $\lambda$, is given by the fact that the first material, supplementally to providing a high mechanical stability and vibration resistance of the temperature sensor 7, yields a heat insulation between the liquid 5 and the environment, on the one hand, and the electronics 4, on the other hand.

LIST OF REFERENCE CHARACTERS

1 thermometer
2 protective tube
3 sensor head
4 electronics unit
5 liquid
6 filler
7 temperature sensor
8 sensor element
9a,9b connection wires
10 first material
10a first subregion
11 second material
11a second subregion
λ thermal conductivity
T temperature
V internal volume of the sensor head

The invention claimed is:

1. An apparatus for determining and/or monitoring temperature of a liquid, including:
   at least one temperature sensor arranged in a sensor head;
   wherein at least one internal volume of the sensor head is at least partially filled with at least one first material and at least partially with at least one second material;
   wherein the first material serves for affixing at least one component of the temperature sensor within the sensor head;
   wherein the first material is embodied to stabilize mechanically at least one component of the at least one temperature sensor within the sensor head, and to protect the at least one component against vibrations;
   wherein the first material is a ceramic, a magnesium oxide, an aluminum oxide, or a curable ceramic potting compound;
   wherein the second material serves for heat conduction within the sensor head; and
   wherein the second material is carbon nanotubes.

2. The apparatus of claim 1, wherein the temperature sensor includes at least one temperature sensitive sensor element and at least one connection wire for contacting the sensor element.

3. The apparatus of claim 2, wherein the at least one internal volume of the sensor head has at least two subregions, wherein a first subregion of the at least one internal volume is filled with the first material and wherein a second subregion of the at least one internal volume is filled with the second material.

4. The apparatus of claim 3, wherein the first subregion is arranged at least partially in a region of the at least one connection wire, and wherein the second subregion is arranged at least partially in a region of the at least one temperature sensitive sensor element.

5. The apparatus of claim 1, wherein the first material is further embodied to provide electrical insulation of the at least one component.

6. The apparatus of claim 1, wherein the second material has a thermal conductivity λ of λ>100W/(mK) at 0° C.

7. The apparatus of claim 1, wherein the second material is selected in such a manner that a thermal time constant (τ) for a cube shaped body of the second material with a volume of 1 mm$^3$ is less than 0.1 s.

8. The apparatus of claim 1, wherein the at least one internal volume of the sensor head is filled with a mixture including at least the first material and the second material.

9. The apparatus of claim 1, wherein the sensor head includes a cylindrical lateral surface and a circular floor element.

10. The apparatus of claim 1, wherein the temperature sensor includes a resistance element or a thermocouple.

11. A method for manufacturing an apparatus for determining and/or monitoring temperature of a liquid, including steps of:
    introducing at least one component of a temperature sensor into a sensor head; and
    filling an internal volume of the sensor head at least partially with at least one first material and at least partially with at least one second material;
    wherein the first material serves for affixing at least one component of the temperature sensor within the sensor head;
    wherein the first material is embodied to stabilize mechanically at least one component of the at least one temperature sensor within the sensor head, and to protect the at least one component against vibrations;
    wherein the first material is a ceramic, a magnesium oxide, an aluminum oxide, or a curable ceramic potting compound;
    wherein the second material serves for heat conduction within the sensor head; and
    wherein the second material is carbon nanotubes.

12. The method of claim 11, wherein at least one internal volume of the sensor head is filled with a mixture including at least the first material and the second material.

13. The method of claim 12, wherein the first material is filled into a first subregion, and wherein the second material is filled into a second subregion.

* * * * *